US008244679B1

(12) United States Patent
Bilsborough (10) Patent No.: US 8,244,679 B1
(45) Date of Patent: Aug. 14, 2012

(54) SYSTEMS AND METHODS FOR USING SINGLE-INSTANCE-STORAGE INFORMATION TO RECLAIM STORAGE SPACE OCCUPIED BY ARCHIVED DATA ELEMENTS

(75) Inventor: Michael Bilsborough, Reading (GB)

(73) Assignee: Symantec Corporation, Mountain View, CA (US)

( * ) Notice: Subject to any disclaimer, the term of this patent is extended or adjusted under 35 U.S.C. 154(b) by 289 days.

(21) Appl. No.: 12/550,763

(22) Filed: Aug. 31, 2009

(51) Int. Cl.
*G06F 17/30* (2006.01)
*G06F 17/00* (2006.01)
(52) U.S. Cl. .................. 707/640; 707/644; 707/654
(58) Field of Classification Search .......... 707/640–654; 709/203
See application file for complete search history.

(56) References Cited

U.S. PATENT DOCUMENTS

| 7,305,430 | B2* | 12/2007 | Choubey et al. ............... 709/203 |
| 7,673,099 | B1* | 3/2010 | Beaverson et al. ........... 711/118 |
| 7,702,664 | B2* | 4/2010 | Jankowsky et al. ..... 707/999.206 |
| 7,996,371 | B1* | 8/2011 | Deshmukh ..................... 707/692 |
| 8,055,864 | B2* | 11/2011 | Sawdon et al. ............... 711/162 |

OTHER PUBLICATIONS

"Creating an E-mail Stubbing Task"; Nov. 2008; IBM; http://publib.boulder.ibm.com/infocenter/email/v2r1m0/index.jsp?topic=/com.ibm.content.collector.doc/icc-help/tasks/t_a, Printed Jul. 10, 2009.
"How it Works—EMS Enterprise Archive™: Storage Management"; Dell; accessed on Jul. 10, 2009; http://www.messageone.com/email-archiving/how-storage-management-works.

* cited by examiner

*Primary Examiner* — Yicun Wu
(74) *Attorney, Agent, or Firm* — Advantedge Law Group (57) ABSTRACT

A computer-implemented method for using single-instance-storage information to reclaim storage space occupied by archived data elements may include: 1) receiving a request to archive a data element on a computing device, 2) determining that a prior instance of the data element has been archived by an archiving system, 3) determining that the archived instance of the data element has been backed up by a backup system, and then, upon determining that the archived instance of the data element has been backed up, 4) reclaiming storage space on the computing device by removing the data element from the computing device. Corresponding systems and computer-readable media are also disclosed.

18 Claims, 8 Drawing Sheets

SYSTEMS AND METHODS FOR USING SINGLE-INSTANCE-STORAGE INFORMATION TO RECLAIM STORAGE SPACE OCCUPIED BY ARCHIVED DATA ELEMENTS

BACKGROUND

Archiving systems (such as email-archiving systems) typically copy data elements (such as emails) from a source system to an archived system in order to conserve storage resources on the source system. In order to eliminate the potential for data loss, archiving systems typically delay removing a data element from the source system until an archived instance of this data element has been backed up by a backup system.

Because backup systems typically consume and/or interrupt a large amount of computing resources when backing up an archiving system, a backup system may only back up an archiving system on a periodic (e.g., weekly or monthly) basis. Thus, since conventional archiving systems may not remove data elements from a source system until an archived instance of these data elements has been backed up, even if a user of the source system archives a number of data elements, the user may be unable to reclaim the storage space occupied by these data elements until the backup system completes its typical backup cycle. In some cases, the delay between when a user has archived a data element and when the physical copy of this data element is removed from the user's system may exceed a number of days or weeks. Unfortunately, because some email quotas and policies prevent users from sending or receiving emails until the users' inbox has been reduced to a specific size, such delays may prevent a user from sending or receiving emails for days or weeks at a time, even if the user has designated a large portion of his/her emails for archiving.

SUMMARY

As will be described in greater detail below, the instant disclosure generally relates to systems and methods for using single-instance-storage information to reclaim storage space occupied by archived data elements. In one example, a system may accomplish this task by: 1) receiving a request to archive a data element on a computing device (from, e.g., a user or administrator of the computing device), 2) determining that a prior instance of the data element has been archived by an archiving system, 3) determining that the archived instance of the data element has been backed up by a backup system, and then, upon determining that the archived instance of the data element has been backed up, 4) immediately (i.e., without archiving or backing up the data element) reclaiming storage space on the computing device by removing the data element from the computing device.

By removing a data element from a computing device immediately upon determining that an archived instance of the data element has been backed up, the systems and methods described herein may allow users and administrators to quickly reclaim storage space without the fear of potential data loss. As such, these systems and methods may enable users and administrators to comply with various quotas and policies on an as-needed basis, even if compliance with the same occurs between scheduled backup cycles.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for using single-instance-storage information to reclaim storage space occupied by archived data elements. For the purposes of this disclosure, the term "data element" generally refers to any type or form of data structure. Examples of data elements include all or a portion of a file, all or a portion of an email, all or a portion of an email attachment, and/or any other type or form of data structure that may be archived and/or backed up.

Figure 1:
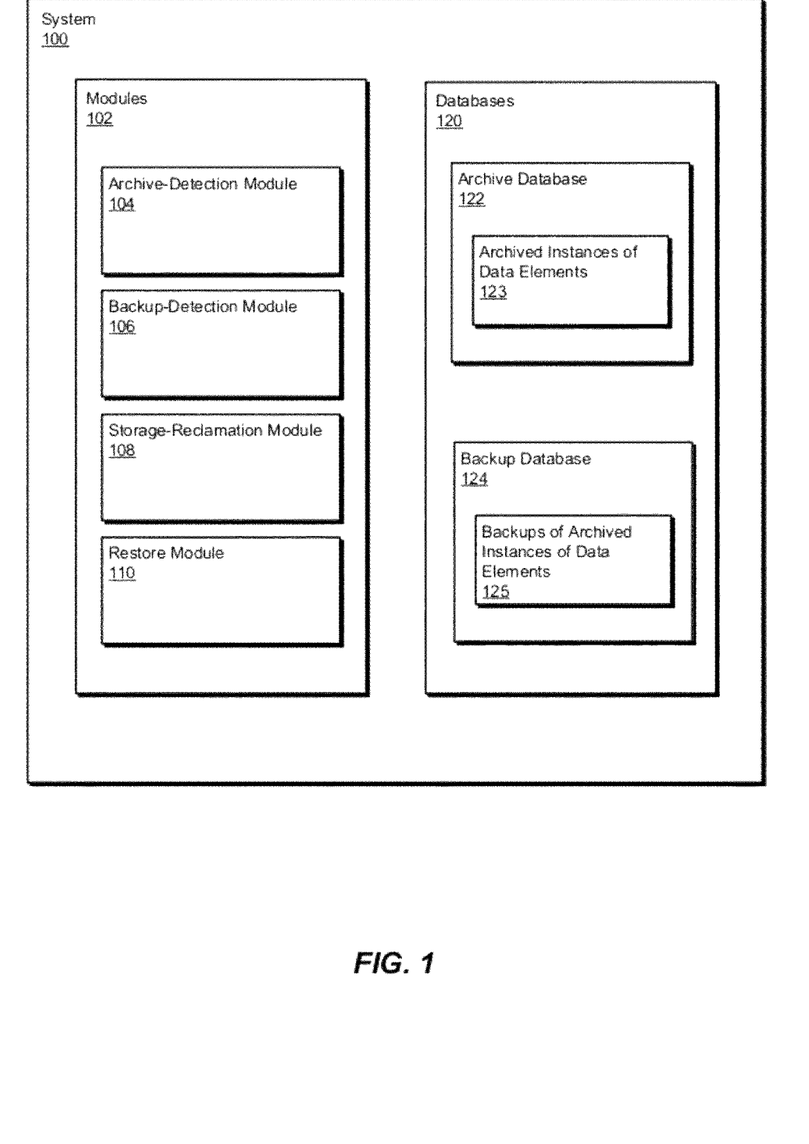
FIG. 1 is a block diagram of an exemplary system for using single-instance-storage information to reclaim storage space occupied by archived data elements.
Figure 2:
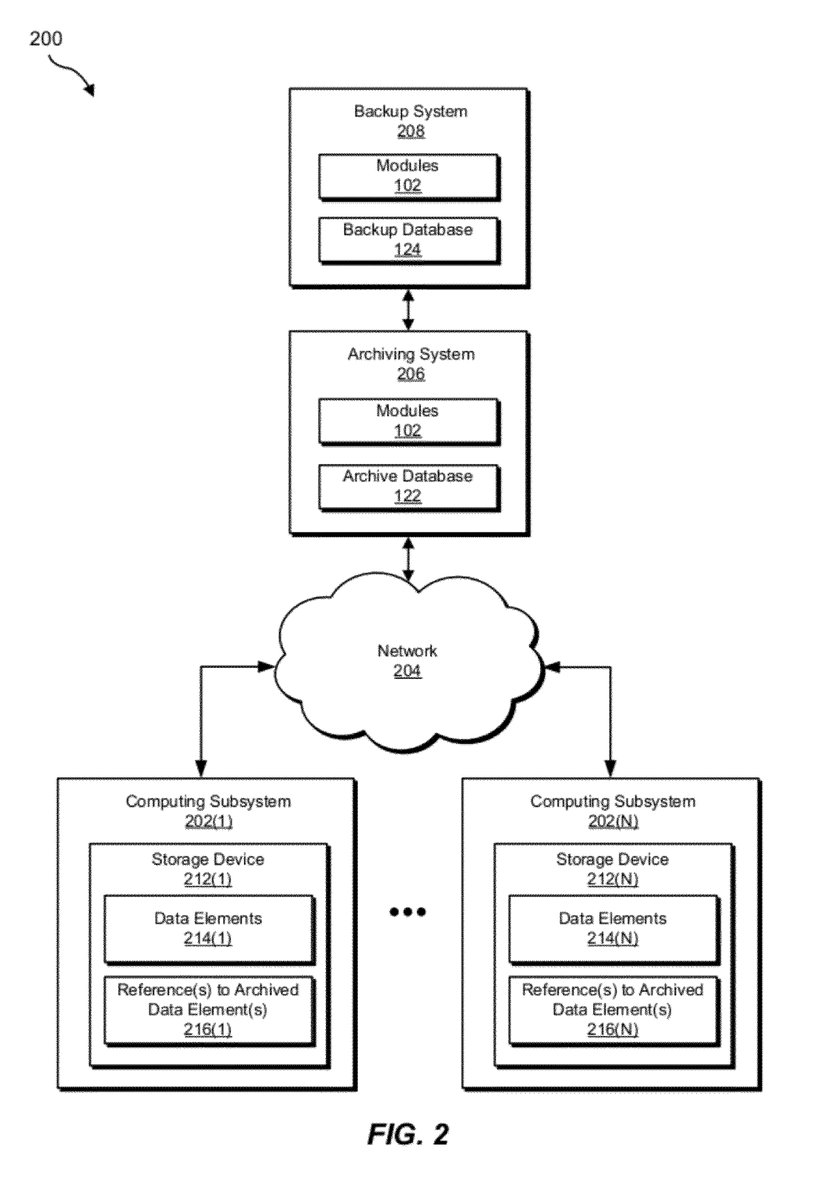
FIG. 2 is a block diagram of an exemplary system for using single-instance-storage information to reclaim storage space occupied by archived data elements.

The following will provide, with reference to FIGS. 1-2, detailed descriptions of exemplary systems for using single-instance-storage information to reclaim storage space occupied by archived data elements. Detailed descriptions of corresponding computer-implemented methods will also be provided in connection with FIGS. 3-6. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for using single-instance-storage information to reclaim storage space occupied by archived data elements. As illustrated in this figure, exemplary system 100 may include one or more modules 102 for performing one or more tasks. For example, and as will be explained in greater detail below, exemplary system 100 may include an archive-detection module 104 programmed to determine, upon receiving a request to archive a data element, whether a prior instance of the data element has previously been archived. Exemplary system 100 may also include a backup-detection module 106 programmed to determine whether an archived instance of the data element has been backed up.

In addition, and as will be described in greater detail below, exemplary system 100 may include a storage-reclamation module 108 programmed to immediately remove data elements upon determining that an archived instance of the same has been backed up. Exemplary system 100 may also include a restore module 110 programmed to restore archived and backed-up instances of data elements. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing subsystems 202(1)-(N), archiving system 206, and/or backup system 208), computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include one or more databases 120. Databases 120 may represent portions of a single database or computing device or a plurality of databases or computing devices. In one embodiment, exemplary system 100 may include an archive database 122 for storing archived instances 123 of data elements, as will be discussed in greater detail below. Exemplary system 100 may also include a backup database 124 for storing backups 125 of archived instances of data elements, as explained below.

Databases 120 in FIG. 1 may represent a portion of one or more computing devices. For example, databases 120 may represent a portion of computing subsystems 202(1)-(N), archiving system 206, and/or backup system 208 in FIG. 2, computing system 710 in FIG. 7, and/or portions of exemplary network architecture 800 in FIG. 8. Alternatively, databases 120 in FIG. 1 may represent one or more physically separate devices capable of being accessed by a computing device, such as computing subsystems 202(1)-(N), archiving system 206, and/or backup system 208 in FIG. 2, computing system 710 in FIG. 7, and/or portions of exemplary network architecture 800 in FIG. 8.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, system 200 may include a plurality of computing subsystems 202(1)-(N) in communication with an archiving system 206 and a backup system 208 via a network 204. In one embodiment, and as will be described in greater detail below, modules 102 from FIG. 1 may program archiving system 206 to: 1) receive a request to archive a data element on a computing device (e.g., data element 214(1) on computing subsystem 202(1)), 2) determine that a prior instance of data element 214(1) has previously been archived by an archiving system (e.g., archiving system 206), 3) determine that the archived instance of data element 214(1) has been backed up by a backup system (e.g., backup system 208), and then, upon determining that the archived instance of data element 214(1) has been backed up, 4) reclaiming storage space on computing subsystem 202(1) by removing data element 214(1) from storage device 212(1).

Computing subsystems 202(1)-(N) generally represent any type or form of computing device capable of reading computer-executable instructions. Examples of computing subsystems 202(1)-(N) include, without limitation, laptops, desktops, servers, cellular phones, personal digital assistants (PDAs), multimedia players, embedded systems, combinations of one or more of the same, exemplary computing system 710 in FIG. 7, or any other suitable computing device. In some examples, computing subsystems 202(1)-(N) may represent all or a portion of a single community or a plurality of communities. For example, computing subsystems 202(1)-(N) may represent computing systems within a single or a plurality of user bases, a single or a plurality of enterprises, or portions or combinations of one or more of the same.

Archiving system 206 generally represents any type or form of computing device that is capable of archiving data elements (e.g., data elements 214(1)-(N) on computing subsystems 202(1)-(N)). Similarly, backup system 208 generally represents any type or form of computing device that is capable of backing up archived data (e.g., archived instances of data elements stored in archiving database 122 of archiving system 206).

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 800 in FIG. 8, or the like. Network 204 may facilitate communication or data transfer using wireless or wired connections. In one embodiment, network 204 may facilitate communication between computing subsystems 202(1)-(N) and archiving system 206.

Figure 3:
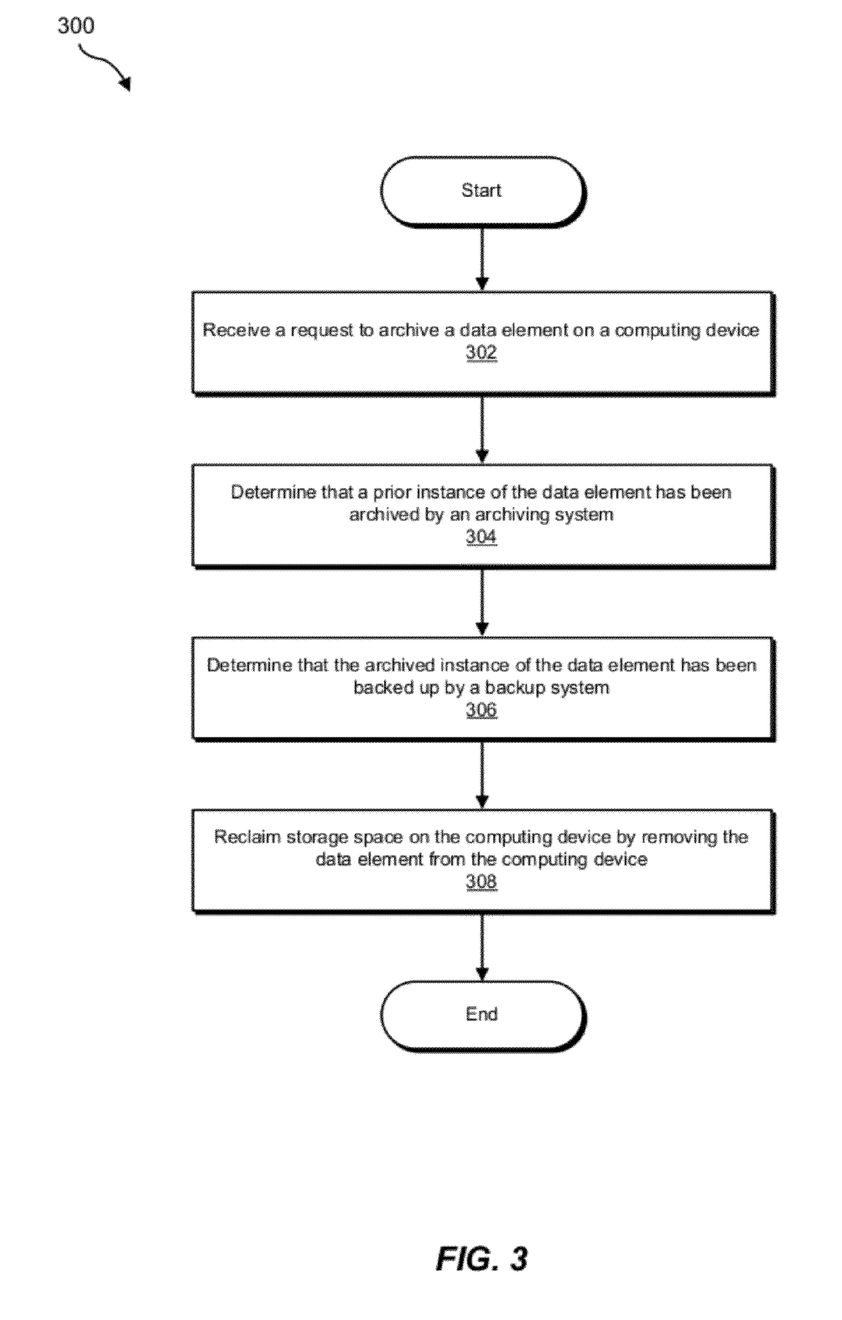
FIG. 3 is a flow diagram of an exemplary method for using single-instance-storage information to reclaim storage space occupied by archived data elements.

FIG. 3 is a flow diagram of an exemplary computer-implemented method 300 for using single-instance-storage information to reclaim storage space occupied by archived data elements. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the various systems described herein may receive a request to archive a data element on a computing device. For example, archive-detection module 104 in FIG. 1 (which may, as detailed above, represent a portion of archiving system 206 in FIG. 2) may receive a request to archive data element 214(1) on computing subsystem 202(1).

The request received in step 302 may originate from a user or an administrator of computing subsystem 202(1). For example, a user of computing subsystem 202(1) may request that archiving system 206 archive an email 402 in FIG. 4 by selecting and designating this email for archiving. Similarly, an administrator of computing subsystems 202(1)-(N) may instruct archiving system 206 to archive various data elements (such as emails generated prior to a specified cutoff date) on computing subsystems 202(1)-(N).

As detailed above, a data element may represent all or a portion of a file, all or a portion of an email, all or a portion of an email attachment, or any other type or form of data structure that may be archived and/or backed up. For example, the data element requested for archiving in step 302 may represent an email attachment 404 ("Presentation.ppt," having a file size of 11.1 MB) associated with an email 402 in FIG. 4. Alternatively, the data element requested for archiving in step 302 may represent the entirety of email 402, including attachments 404 and 406.

Returning to FIG. 3, at step 304 the systems described herein may determine that a prior instance of the data element identified in step 302 has been archived by an archiving system. For example, archive-detection module 104 in FIG. 1 may determine that a prior instance of attachment 404 in FIG. 4 has been archived by archiving system 206 and stored in archive database 122.

Archive-detection module 104 may perform step 304 in a variety of ways. In one example, archive-detection module 104 may compare a hash of the requested data element (e.g., a hash of attachment 404 in FIG. 4) with hashes corresponding to data elements stored in archive database 122 in archiving system 206 in FIG. 2. If archive-detection module 104 identifies a matching hash (e.g., if archive-detection module 104 locates a hash within archive database 122 that is identical to a hash of attachment 404 in FIG. 4), then archive-detection module 104 may determine that a prior instance of this data element has been archived by archiving system 206.

The term "prior instance," as used herein, generally refers to an identical instance of a data element previously encountered within a system (such as system 200 in FIG. 2). For example, email 402 in FIG. 4 may be sent to both a user of computing subsystem 202(1) in FIG. 2 (e.g., "Amber M.") and a user of computing subsystem 202(N) (e.g., "Robert C."). In this example, Robert C. may, upon receiving email 402, designate attachment 404 for archiving. Archiving system 206 may then store an archived instance of attachment 404 in archive database 122 in FIG. 2.

At some later point in time, Amber M. may also designate attachment 404 for archiving. In this example, archive-detection module 104 in FIG. 1 may determine that a prior instance of attachment 404 (i.e., the instance of attachment 404 archived by Robert C. on computing subsystem 202(N)) has already been archived by archiving system 206 and stored in archive database 122.

In some examples, archiving system 206 may implement one or more single-instance-storage policies. For example, archiving system 206 may only store a single instance of a data element, regardless of how many instances of the data element exist within an enterprise or community (e.g., computing subsystems 202(1)-(N)) in order to reduce storage redundancies. In addition, in some examples archiving system 206 may store portions of a single instance of a data element across a plurality of files within archive database 122.

Returning to FIG. 3, at step 306 the various systems described herein may determine that the archived instance of the data element identified in step 304 has been backed up by a backup system. For example, backup-detection module 106 in FIG. 1 (which may, as detailed above, represent a portion of archiving system 206 in FIG. 2) may determine that an archived instance of attachment 404 from email 402 in FIG. 4 has been backed up by backup system 208 in FIG. 2 and stored in backup database 124.

Backup-detection module 104 may perform step 306 in a variety of ways. In one example, backup-detection module 106 may determine whether an archived instance of attachment 404 in FIG. 4 has been backed up by analyzing a backup log stored on archiving system 206 and/or backup system 208. In this example, the backup log may identify files and/or data blocks that have been backed up from archiving system 206 to backup system 208. In another example, backup-detection module 106 may determine whether an archived instance of attachment 404 has been backed up by backup system 208 by scanning backup database 124 (or a cache object associated with backup database 124).

As detailed above, backup systems (such as backup system 208 in FIG. 2) may back up files stored in an archiving system (such as archiving system 206) on a periodic or on-demand basis. For example, backup system 208 may back up files stored in archive database 122 of archiving system 206 on a weekly or monthly basis or as instructed by an administrator of system 200. In these examples, backup-detection module 106 may determine whether an archived instance of a data element has been backed up to backup system 208 by: 1) determining when the archived instance of the data element was created, 2) identifying the date when backup system 208 last backed up files from archiving system 206, and then 3) determining whether the archived instance of the data element was created prior to the last backup date.

Returning to FIG. 3, at step 308 the systems described herein may, upon determining that the archived instance of the data element has been backed up in step 306, reclaim storage space on the computing device by removing the data element from the computing device. For example, once backup-detection module 106 in FIG. 1 determines that an archived instance of attachment 404 from FIG. 4 has been backed up by and stored on backup system 208, storage-reclamation module 108 in FIG. 1 (which may, as detailed above, represent a portion of archiving system 206 in FIG. 2) may instruct computing subsystem 202(1) to immediately delete attachment 404 from storage device 212(1).

Storage-reclamation module 108 may perform step 308 in a variety of ways. In one example, storage-reclamation module 108 may remove a data element (such as attachment 404 in FIG. 4) from the storage device of a computing device immediately upon determining that an archived instance of this data element has previously been backed up. In other words, storage-reclamation module 108 may remove this data element from the computing device without archiving or backing up the data element. Upon completion of step 308, exemplary method 300 in FIG. 3 may terminate.

In some examples, upon removing the data element from the computing device in step 308, storage-reclamation module 108 may create a reference on the computing device that points to the archived instance of the data element stored in the archiving system. For example, as illustrated in FIG. 5, upon instructing computing subsystem 202(1) to remove attachment 404 in FIG. 4 from storage device 212(1), storage-reclamation module 108 may create a reference 504 ("Link to Presentation.ppt"). In this example, reference 504 (which has a file size of 31 KB, as opposed to the original attachment, which had a file size of 11.1 MB) may be stored in place of attachment 404 within email 402 in FIG. 5.

In some examples, reference 504 in FIG. 5 may point to the archived instance of attachment 404 stored in archive database 122 of archiving system 206 in FIG. 2. Thus, when a user of computing subsystem 202(1) desires to access attachment 404, the user may select reference 504. Restore module 110 in FIG. 1 (which may, as detailed above, represent a portion of archiving system 206 in FIG. 2) may then restore attachment 404 by instructing computing subsystem 202(1) to download the archived instance of attachment 404 from archive database 122 of archiving system 206.

Although not illustrated in FIG. 3, in some embodiments exemplary method 300 may also include: 1) receiving a request to archive a second data element (such as a second email attachment associated with an email), 2) determining that a prior instance of the second email attachment has been archived by the archiving system, 3) determining that the archived instance of the second email attachment has not been backed up by the backup system, and then 4) refraining from removing the second email attachment from the computing device until the archived instance of the second email attachment has been backed up by the backup system.

Figure 4:
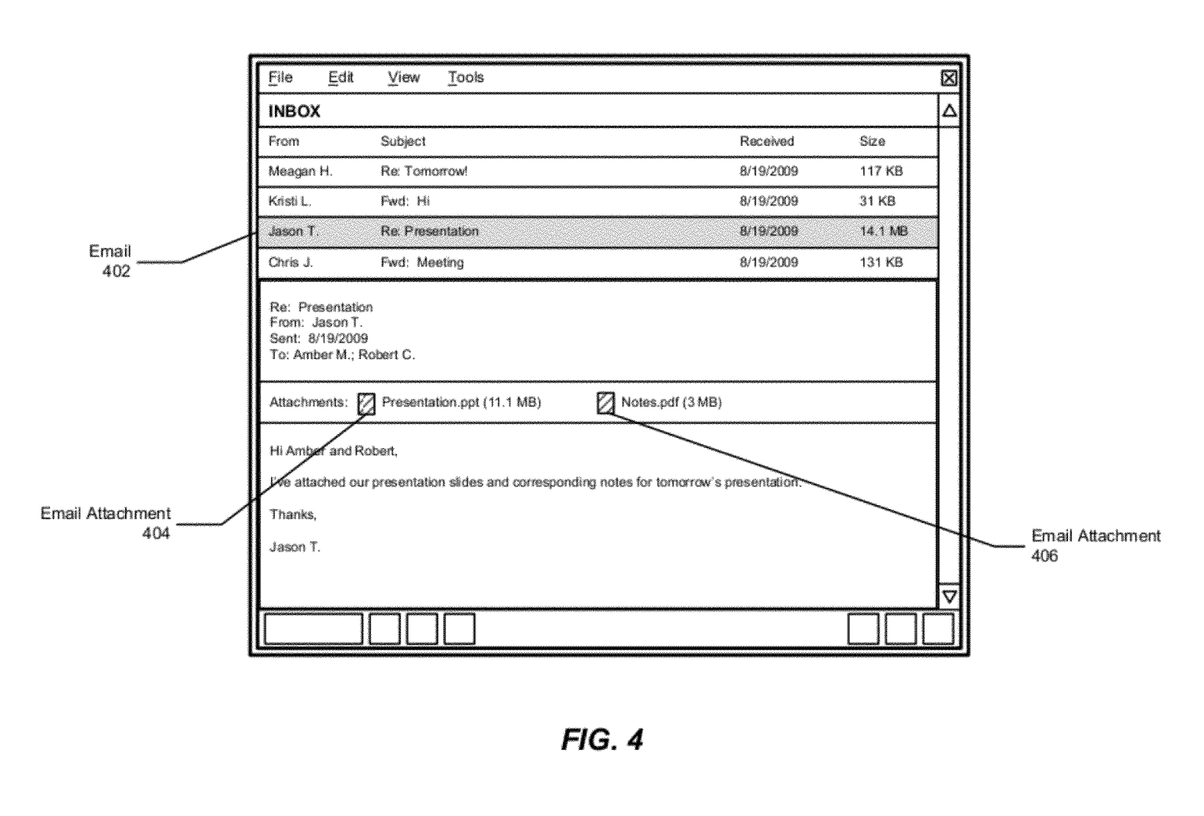
FIG. 4 is a block diagram of an exemplary user interface containing data elements eligible for archiving.
Figure 5:
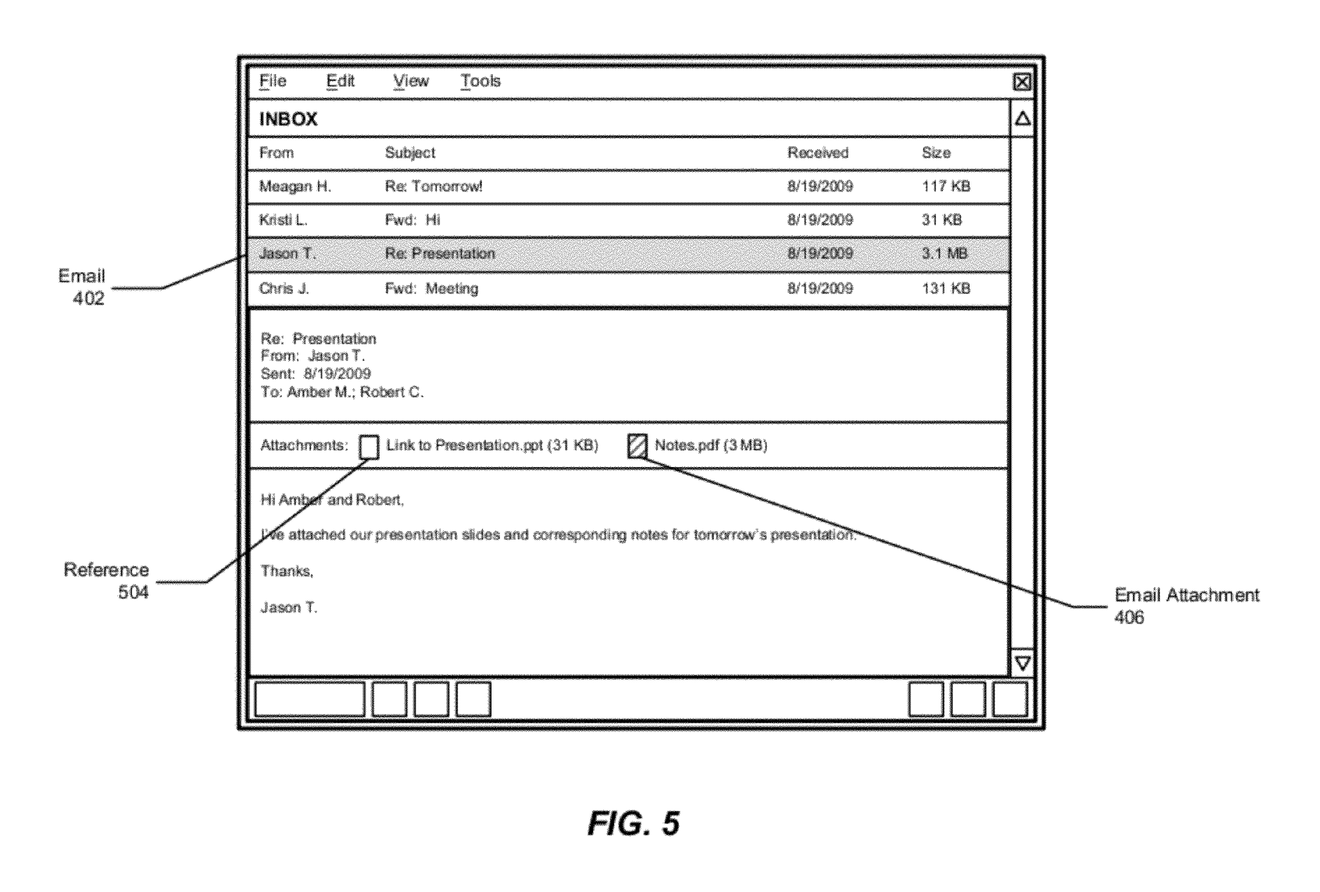
FIG. 5 is a block diagram of an additional embodiment of the exemplary user interface illustrated in FIG. 4.
Figure 6:
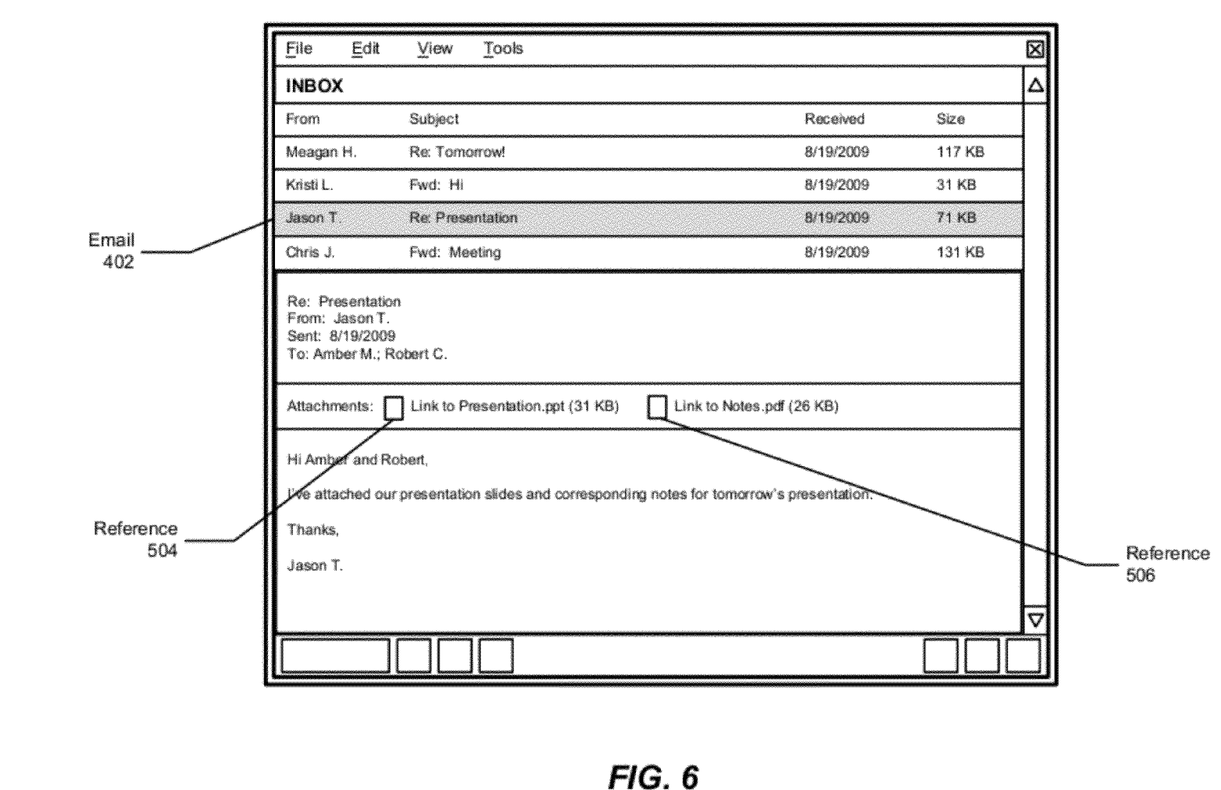
FIG. 6 is a block diagram of an additional embodiment of the exemplary user interface illustrated in FIG. 4.

For example, a user of computing subsystem 202(1) may designate email attachment 406 ("Notes.pdf," having a file size of 3 MB) in FIG. 4 for archiving. In this example, archive-detection module 104 may determine that a prior instance of attachment 406 in FIG. 4 (e.g., an instance archived at the request of "Robert C." on computing subsystem 202(N)) has already been archived by archiving system 206 and stored in archive database 122.

In this example, the archived instance of attachment 406 may have been created subsequent to the most-recent backup of archiving system 206. For example, backup system 208 may have backed up archiving system 206 on 11 Nov. 2008 and archiving system 206 may have archived attachment 406 on 12 Nov. 2008. As such, backup-detection module 106 may determine that an archived instance of attachment 406 has yet to be backed up by backup system 208. In this example, storage-reclamation module 108 may refrain from removing attachment 406 from storage device 212(1) of computing subsystem 202(1). For example, as illustrated in FIG. 5, a full copy of attachment 406 (which, in this example, is 3 MB in size) may remain in email 402, even though an archived instance of this attachment has been stored in archiving system 206.

At some later point in time, backup system 208 may again back up archiving system 206, after which backup-detection module 106 may determine that an archived instance of attachment 406 has been backed up. Once backup-detection module 106 in FIG. 1 determines that an archived instance of attachment 406 has been backed up by and stored on backup system 208, storage-reclamation module 108 may instruct computing subsystem 202(1) to immediately delete attachment 406 from storage device 212(1).

In some examples, storage-reclamation module 108 may then create a reference 506 ("Link to Notes.pdf") that points to the archived instance of attachment 406 stored in archiving system 206. In this example, reference 506 (which has a file size of 26 KB, as opposed to the original attachment, which had a file size of 3 MB) may be stored in place of attachment 406 within email 402 in FIG. 6.

As illustrated in FIG. 5, in some examples a data element (such as email 402) may contain both elements that have been archived and backed up (e.g., attachment 404) and elements that have yet to be archived and/or backed up (e.g., attachment 406). In this example, email 402 may contain a full copy of attachment 406 (since, in this example, attachment 406 may have been archived subsequent to the most-recent backup operation performed by backup system 208), while only containing a reference (e.g., reference 504) to attachment 404 (since, as detailed above, an archived instance of attachment 404 has already been backed up by backup system 208).

In the above example, if archiving system 206 fails (due, e.g., to disk failure or the like), then the systems described herein may: 1) restore the archived instance of attachment 404 from backup system 208 to computing subsystem 202(1) and then 2) classify both attachments 404 and 406 as archive-eligible again. For example, restore module 110 from FIG. 1 (which may, as detailed above, represent a portion of backup system 208 in FIG. 2) may restore the backed-up copy of attachment 404 from backup system 208 into email 402 on computing subsystem 202(1). Attachments 404 and 406 may then again be eligible for archiving.

By removing a data element from a computing device immediately upon determining that an archived instance of the data element has been backed up, the systems and methods described herein may allow users and administrators to quickly reclaim storage space without the fear of potential data loss. As such, these systems and methods may enable users and administrators to comply with various quotas and policies on an as-needed basis, even if compliance with the same occurs between scheduled backup cycles.

Figure 7:
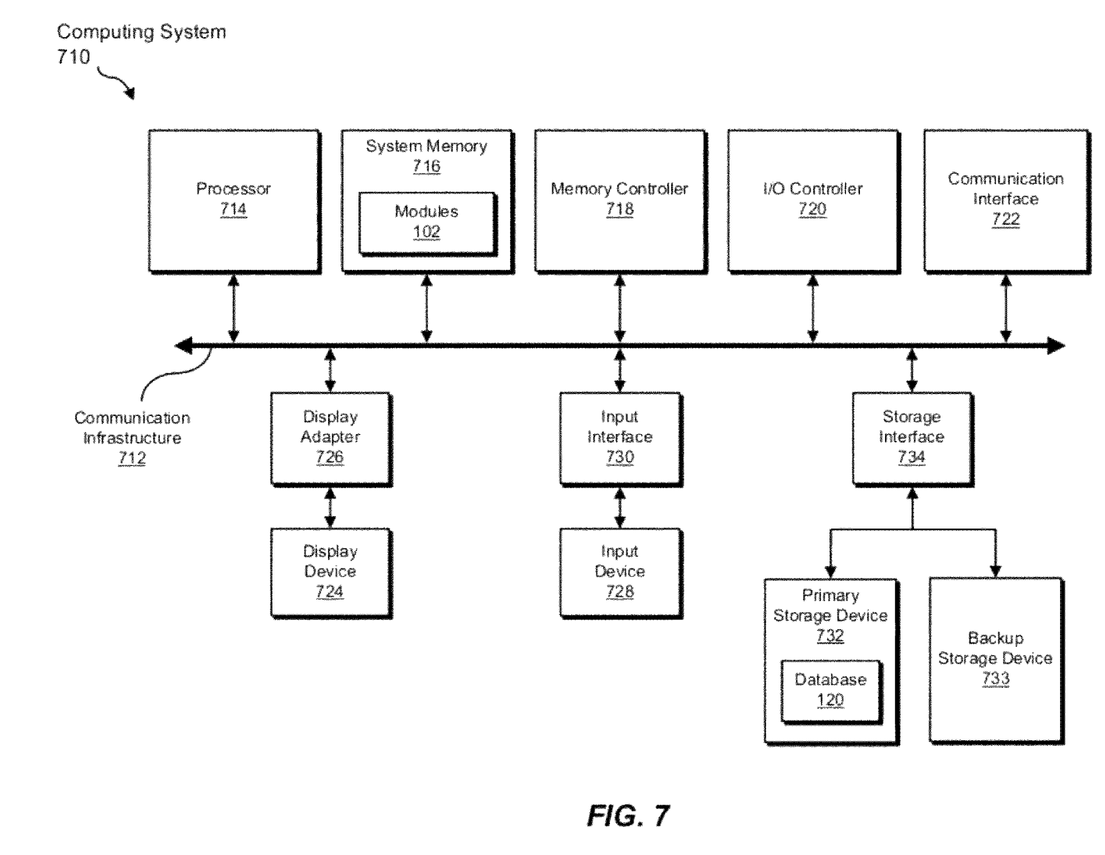
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein. For example, processor 714 may perform and/or be a means for performing, either alone or in combination with other elements, one or more of the receiving, determining, reclaiming, removing, removing, creating, refraining, maintaining, detecting, restoring, and classifying steps described herein. Processor 714 may also perform and/or be a means for performing any other steps, methods, or processes described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller may perform and/or be a means for performing, either alone or in combination with other elements, one or more of the steps or features described and/or illustrated herein, such as receiving, determining, reclaiming, removing, removing, creating, refraining, maintaining, detecting, restoring, and classifying.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734. I/O controller 720 may be used, for example, to perform and/or be a means for performing, either alone or in combination with other elements, one or more of the receiving, determining, reclaiming, removing, removing, creating, refraining, maintaining, detecting, restoring, and classifying steps described herein. I/O controller 720 may also be used to perform and/or be a means for performing other steps and features set forth in the instant disclosure.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution. In certain embodiments, communication interface 722 may perform and/or be a means for performing, either alone or in combination with other elements, one or more of the receiving, determining, reclaiming, removing, removing, creating, refraining, maintaining, detecting, restoring, and classifying steps disclosed herein. Communication interface 722 may also be used to perform and/or be a means for performing other steps and features set forth in the instant disclosure.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device. In at least one embodiment, input device 728 may perform and/or be a means for performing, either alone or in combination with other elements, one or more of the receiving, determining, reclaiming, removing, removing, creating, refraining, maintaining, detecting, restoring, and classifying steps disclosed herein. Input device 728 may also be used to perform and/or be a means for performing other steps and features set forth in the instant disclosure.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a floppy disk drive, a magnetic tape drive, an optical disk drive, a flash drive, or the like. Storage interface 734 generally represents any type or form of interface or device for transferring data between storage devices 732 and 733 and other components of computing system 710. In one example, databases 120 from FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

In certain embodiments, storage devices 732 and 733 may be used, for example, to perform and/or be a means for performing, either alone or in combination with other elements, one or more of the receiving, determining, reclaiming, removing, removing, creating, refraining, maintaining, detecting, restoring, and classifying steps disclosed herein. Storage devices 732 and 733 may also be used to perform and/or be a means for performing other steps and features set forth in the instant disclosure.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
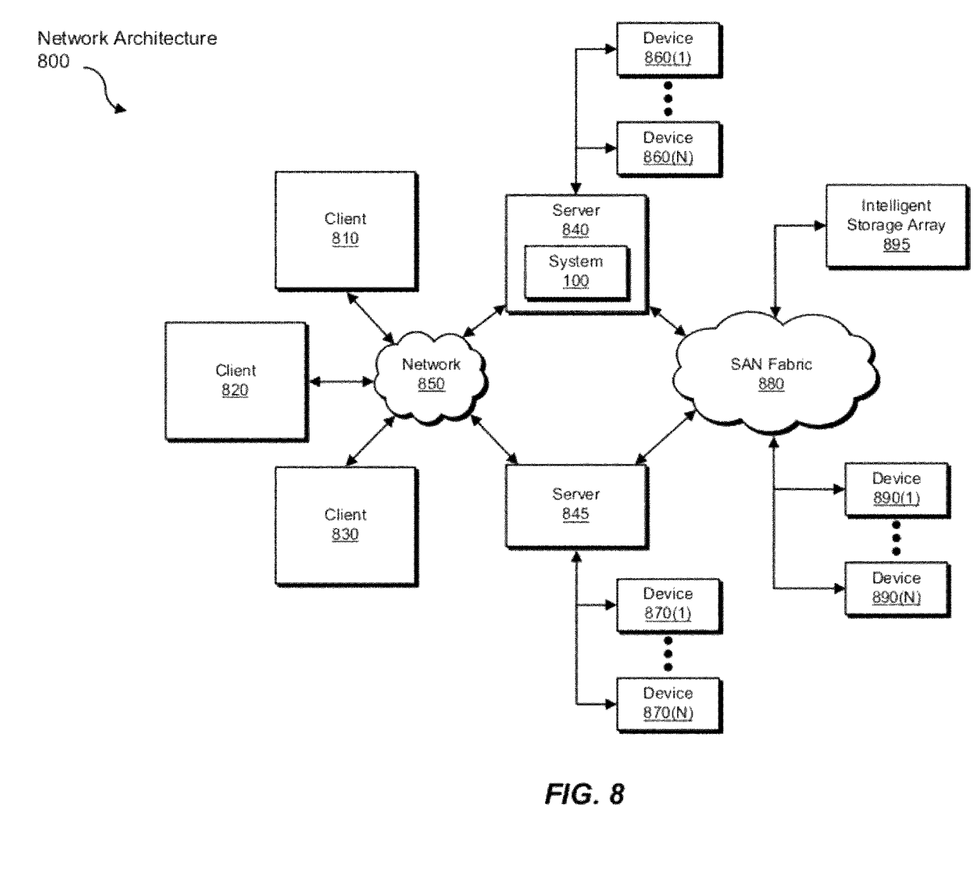
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. Client systems 810, 820, and 830 generally represent any type or form of computing device or system, such as exemplary computing system 710 in FIG. 7. In one example, server 840 may include system 100 from FIG. 1.

Similarly, servers 840 and 845 generally represent computing devices or systems, such as application servers or database servers, configured to provide various database services and/or run certain software applications. Network 850 generally represents any telecommunication or computer network including, for example, an intranet, a wide area network (WAN), a local area network (LAN), a personal area network (PAN), or the Internet.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890 (1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850. Accordingly, network architecture 800 may perform and/or be a means for performing, either alone or in combination with other elements, one or more of the receiving, determining, reclaiming, removing, removing, creating, refraining, maintaining, detecting, restoring, and classifying steps disclosed herein. Network architecture 800 may also be used to perform and/or be a means for performing other steps and features set forth in the instant disclosure.

As detailed above, computing system 710 and/or one or more components of network architecture 800 may perform and/or be a means for performing, either alone or in combination with other elements, one or more steps of an exemplary method for using single-instance-storage information to reclaim storage space occupied by archived data elements. In one example, such a method may include: 1) receiving a request to archive a data element on a computing device, 2) determining that a prior instance of the data element has been archived by an archiving system, 3) determining that the archived instance of the data element has been backed up by a backup system, and then, upon determining that the archived instance of the data element has been backed up, 4)

reclaiming storage space on the computing device by removing the data element from the computing device.

In some examples, receiving the request to archive the data element on the computing device may include receiving a request from a user or administrator of the computing device to archive the data element. In addition, removing the data element from the computing device may include removing the data element from the computing device without archiving or backing up the data element. Removing the data element from the computing device may also include removing the data element from the computing device immediately upon determining that the archived instance of the data element has been backed up.

In one example, the method may also include, upon removing the data element from the computing device, creating a reference on the computing device that points to the archived instance of the data element in the archiving system. The data element may represent at least a portion of a file, at least a portion of an email, and/or at least a portion of an email attachment.

In some examples, the data element may represent a first email attachment associated with an email and the method may further include: 1) receiving a request to archive a second email attachment associated with the email, 2) determining that a prior instance of the second email attachment has been archived by the archiving system, 3) determining that the archived instance of the second email attachment has not been backed up by the backup system, and then 4) refraining from removing the second email attachment from the computing device until the archived instance of the second email attachment has been backed up by the backup system.

In this example, the method may also include, upon removing the first email attachment from the computing device: 1) creating a reference on the computing device that points to the archived instance of the first email attachment in the archiving system and 2) maintaining a copy of the second email attachment on the computing device. The method may also include: 1) determining that the archived instance of the second email attachment has been backed up by the backup system, 2) further reclaiming storage space on the computing device by removing the second email attachment from the computing device, and then 3) creating a reference on the computing device that points to the archived instance of the second email attachment in the archiving system.

The method may also include: 1) detecting failure of the archiving system, 2) restoring the archived instance of the first email attachment from the backup system to the computing device, and then 3) classifying both the first email attachment and the second email attachment as archive-eligible. The method may also include: 1) receiving a request to restore the data element to the computing device and then 2) restoring the archived instance of the data element from the archiving system to the computing device.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, storage-reclamation module 108 in FIG. 1 may transform a property or characteristic of computing subsystems 202(1)-(N) by immediately removing data elements from computing subsystems 202(1)-(N) upon determining that an archived instance of the data elements has been backed up.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for using single-instance-storage information to immediately reclaim storage space occupied by archived data elements, at least a portion of the method being performed by a server-side archiving system comprising at least one processor, the method comprising:

receiving a request from a client-side computing device to archive a data element on the client-side computing device;

determining that a prior instance of the data element was previously archived by the server-side archiving system such that an archived instance of the data element already exists within the server-side archiving system;

determining that the archived instance of the data element has been backed up by a server-side backup system that is separate from the server-side archiving system;

in response to determining that the archived instance of the data element has been backed up, immediately reclaiming storage space occupied by the data element on the client-side computing device by removing the data element from the client-side computing device without archiving or backing up the data element.

2. The method of claim 1, wherein receiving the request from the client-side computing device to archive the data element on the client-side computing device comprises at least one of:
   receiving a request from a user of the client-side computing device to archive the data element;
   receiving a request from an administrator of the client-side computing device to archive the data element.

3. The method of claim 1, wherein removing the data element from the client-side computing device comprises immediately reclaiming storage space previously allocated to the data element within an account associated with the client-side computing device that is subject to a storage quota.

4. The method of claim 1, further comprising, upon removing the data element from the client-side computing device, creating a reference on the client-side computing device that points to the archived instance of the data element in the server-side archiving system.

5. The method of claim 1, wherein the data element comprises at least one of:
   at least a portion of a file;
   at least a portion of an email;
   at least a portion of an email attachment.

6. The method of claim 1, wherein the data element comprises a first email attachment associated with an email, and the method further comprises:
   receiving a request from the client-side computing device to archive a second email attachment associated with the email;
   determining that a prior instance of the second email attachment was previously archived by the server-side archiving system;
   determining that the archived instance of the second email attachment has not been backed up by the server-side backup system;
   refraining from removing the second email attachment from the client-side computing device until the archived instance of the second email attachment has been backed up by the server-side backup system.

7. The method of claim 6, further comprising, upon removing the first email attachment from the client-side computing device:
   creating a reference on the client-side computing device that points to an archived instance of the first email attachment in the server-side archiving system;
   maintaining a copy of the second email attachment on the client-side computing device.

8. The method of claim 7, further comprising:
   determining that the archived instance of the second email attachment has been backed up by the server-side backup system;
   further reclaiming storage space occupied by the second email attachment on the client-side computing device by removing the second email attachment from the client-side computing device;
   creating a reference on the client-side computing device that points to the archived instance of the second email attachment in the server-side archiving system.

9. The method of claim 6, further comprising:
   detecting failure of the server-side archiving system;
   restoring an archived instance of the first email attachment from the server-side backup system to the client-side computing device;
   classifying both the first email attachment and the second email attachment as archive-eligible.

10. The method of claim 1, further comprising:
    receiving a request to restore the data element to the client-side computing device;
    restoring the archived instance of the data element from the server-side archiving system to the client-side computing device.

11. A system for using single-instance-storage information to immediately reclaim storage space occupied by archived data elements, the system comprising:
    an archive-detection module programmed to:
        receive a request from a client-side computing device to archive a data element on the client-side computing device;
        determine that a prior instance of the data element was previously archived by a server-side archiving system such that an archived instance of the data element already exists within the server-side archiving system;
    a backup-detection module programmed to determine that the archived instance of the data element has been backed up by a server-side backup system that is separate from the server-side archiving system;
    a storage-reclamation module programmed to immediately reclaim storage space occupied by the data element on the client-side computing device in response to determining that the archived instance of the data element has been backed up by removing the data element from the client-side computing device without archiving or backing up the data element;
    at least one processor configured to execute the archive-detection module, the backup-detection module, and the storage-reclamation module.

12. The system of claim 11, wherein the request comprises:
    a request from a user of the client-side computing device to archive the data element;
    a request from an administrator of the client-side computing device to archive the data element.

13. The system of claim 11, wherein the storage-reclamation module removes the data element from the client-side computing device by immediately reclaiming storage space previously allocated to the data element within an account associated with the client-side computing device that is subject to a storage quota.

14. The system of claim 11, wherein:
    the data element comprises a first email attachment associated with an email;
    the archive-detection module is further programmed to:
        receive a request from the client-side computing device to archive a second email attachment associated with the email;
        determine that a prior instance of the second email attachment was previously archived by the server-side archiving system;
    the backup-detection module is further programmed to determine that the archived instance of the second email attachment has not been backed up by the server-side backup system;
    the storage-reclamation module is further programmed to refrain from removing the second email attachment from the client-side computing device until the archived instance of the second email attachment has been backed up by the server-side backup system.

15. The system of claim 14, wherein the storage-reclamation module is further programmed to:
    create a reference on the client-side computing device that points to an archived instance of the first email attachment in the server-side archiving system;

maintain a copy of the second email attachment on the client-side computing device.

16. The system of claim 15, wherein:
the backup-detection module is further programmed to determine that the archived instance of the second email attachment has been backed up by the server-side backup system;
the storage-reclamation module is further programmed to:
reclaim storage space occupied by the second email attachment on the client-side computing device by removing the second email attachment from the client-side computing device;
create a reference on the client-side computing device that points to the archived instance of the second email attachment in the server-side archiving system.

17. The system of claim 14, further comprising a restore module programmed to:
detect failure of the server-side archiving system;
restore an archived instance of the first email attachment from the server-side backup system to the client-side computing device;
classify both the first email attachment and the second email attachment as archive-eligible.

18. A computer-readable medium comprising computer-executable instructions that, when executed by at least one processor of a computing system, cause the computing system to:
receive a request from a client-side computing device to archive a data element on the client-side computing device;
determine that a prior instance of the data element was previously archived by a server-side archiving system such that an archived instance of the data element already exists within the server-side archiving system;
determine that the archived instance of the data element has been backed up by a server-side backup system that is separate from the server-side archiving system;
in response to determining that the archived instance of the data element has been backed up, immediately reclaim storage space occupied by the data element on the client-side computing device by removing the data element from the client-side computing device without archiving or backing up the data element.

* * * * *